US007781693B2

(12) United States Patent
Cormack

(10) Patent No.: US 7,781,693 B2
(45) Date of Patent: Aug. 24, 2010

(54) METHOD AND SYSTEM FOR SORTING INCOMING MAIL

(76) Inventor: Cameron Lanning Cormack, 10435 - 139 Street, Edmonton, Alberta (CA) T5N 2K6

( * ) Notice: Subject to any disclaimer, the term of this patent is extended or adjusted under 35 U.S.C. 154(b) by 993 days.

(21) Appl. No.: 11/419,952

(22) Filed: May 23, 2006

(65) Prior Publication Data

US 2007/0272601 A1 Nov. 29, 2007

(51) Int. Cl.
*G06K 9/00* (2006.01)

(52) U.S. Cl. ........................ 209/584; 209/583; 209/900

(58) Field of Classification Search ................. 209/583, 209/584, 900; 700/223–227

See application file for complete search history.

(56) References Cited

U.S. PATENT DOCUMENTS

| | | | | |
|---|---|---|---|---|
| 5,009,321 | A | 4/1991 | Keough | |
| 5,042,667 | A | 8/1991 | Keough | |
| 5,588,520 | A * | 12/1996 | Affaticati et al. | 198/370.06 |
| 6,079,570 | A | 6/2000 | Oppliger et al. | |
| 6,126,017 | A | 10/2000 | Hours | |
| 6,227,378 | B1 | 5/2001 | Jones et al. | |
| 6,478,138 | B1 * | 11/2002 | Edwards et al. | 198/370.06 |
| 6,566,620 | B1 | 5/2003 | Lohmann | |
| 6,888,084 | B1 * | 5/2005 | Bayer | 209/584 |
| 2003/0201212 | A1 * | 10/2003 | Reed | 209/702 |
| 2003/0208298 | A1 | 11/2003 | Edmonds | |
| 2004/0035762 | A1 | 2/2004 | Brown | |
| 2004/0065595 | A1 | 4/2004 | Hanson | |
| 2004/0065596 | A1 | 4/2004 | Hanson | |
| 2004/0065597 | A1 | 4/2004 | Hanson | |
| 2006/0016738 | A1 * | 1/2006 | Norris et al. | 209/584 |
| 2006/0124512 | A1 * | 6/2006 | Quine et al. | 209/584 |

FOREIGN PATENT DOCUMENTS

| | | |
|---|---|---|
| CA | 1061000 | 8/1979 |
| CA | 1062811 | 9/1979 |

(Continued)

OTHER PUBLICATIONS

MailCode, "OCR to the Power of x; A Revolutionary OCR Processing Technology for Maximum Read Rates," undated, 1 page.

(Continued)

*Primary Examiner*—John Q Nguyen
*Assistant Examiner*—Kalyanavenkateshware Kumar
(74) *Attorney, Agent, or Firm*—Scott T. Griggs; Griggs Bergen LLP

(57) ABSTRACT

A method and system for sorting mailpieces in a single pass is provided. The system consists of a mail feeding unit, a mail scanner and a mail distribution unit having a number of receiving bins. Mailpieces are fed into the system one at a time through the scanner to determine the mailstop of the mailpiece. A control system assigns unique mailstops to unique receiving bins. Each mailpiece is deposited in a receiving bin assigned with its mailstop. When the number of mailstops exceeds the number of receiving bins, the control system empties a receiving bin and assigns the new mailstop to the emptied bin so it can receive mailpieces having the new mailstop. Accordingly, the system can sort mail destined for "m" mailstops into "n" receiving bins where "m" is greater than "n".

25 Claims, 8 Drawing Sheets

FOREIGN PATENT DOCUMENTS

| | | |
|---|---|---|
| CA | 2434261 | 7/2002 |

OTHER PUBLICATIONS firstLOGIC, "A Guide to Matching Methodologies; Maximize the results through a combination of best-of-breed algorithms," 8 pages.
OPEX Corporation, "MPS 40, Mail Sorting Equipment for Incoming and Outgoing Mail Automation Solutions," printed on Aug. 10, 2004, from http://www.opex.com/mps40.htm, 3 pages.
OPEX Corporation, "Introducing the MPS 17, Mail Sorting Equipment for Incoming and Outgoing Mail Automation Solutions," printed on Aug. 10, 2004, from http://www.opex.com/mps17.htm, 3 pages.
NPI, "NPI Mail Sorting Equipment Home," printed on Aug. 10, 2004 from http://www.nationalpresort.com/index.asp, 1 page.
MailCode, "Olympus II Multi-tier Provides High-speed Letter Mail Processing," printed on Aug. 10, 2004 from http://www.mailcode.com/pages/products/prod_olymp2_mt.html, 4 pages.
MailCode, "Olympus II Is for High-speed Incoming and Interoffice Mail Processing," printed on Aug. 10, 2004 from http://www.mailcode.com/pages/products/prod_olymp2_is.html, 4 pages.
Bowe Bell & Howell, "Document Processing Solutions—Products—FlexiSort," printed on Aug. 10, 2004 from http://www.bellhowell.com/dps/products/1275_flexiSort.shtml, 2 pages.
Bowe Bell & Howell, "Document Processing Solutions—Products—Criterion," printed on Aug. 10, 2004 from http://www.bellhowell.com/dps/products/1275_criterion.shtml, 3 pages.
Dispatcher, "The Total Incoming, Outgoing and Interoffice Solution Now with Address and Sort!" printed on Aug. 10, 2004 from http://www.idmailsystems.com/page17.html, 4 pages.
Siemens Dematic Ltd/UK—"Postal Automation," printed on Aug. 10, 2004 from http://www.siemens-dematic.co.uk/en/p_nav4.html, 2 pages.

* cited by examiner

METHOD AND SYSTEM FOR SORTING INCOMING MAIL

FIELD OF THE INVENTION

The invention disclosed herein relates generally to methods and systems for automated mail sorting and, more particularly, methods and systems for the automated sorting of incoming mail.

BACKGROUND OF THE INVENTION

A number of mail sorting apparatus exist that can handle the sorting of outgoing mail. Few machines exist that can effectively handle the requirements of incoming mail sorting. Quite often, outgoing mail sorting machines are used for incoming mail sorting. These machines have large footprints and are considered costly.

Usually when an organization has volumes of incoming mail that warrant an incoming mail sorting apparatus, they also have a large number of required sort destinations, also known as mailstops, needed as delivery points across their organization. Typically, an organization may have a large number of mailstops thereby requiring a large number of receiving bins in the mail sorting machine. The requirement for a large number of receiving bins increases the cost of these machines. These machines also have very large footprints when outfitted with a substantial number of receiving bins, in comparison to the typical allotment of floor space for mail sorting. When the sorting apparatus has the same number of required sort destinations as it has receiving bins, then the sorting process can be handled with a single-pass of the mailpieces through the apparatus.

There are sorting apparatus that are better suited for incoming sorting when cost and space constraints are a concern. These sorters often have fewer receiving bins than the number of required sort destinations. As a result, the mailpieces need to make multiple passes through the apparatus to get sorted to the proper receiving bin. There are a number of schemes available to maximize the sort process for multi-pass sorting apparatus. In a multi-pass apparatus, the common requirement is to take a portion of the mailpieces from the output end, then manually reload them into the input end of the machine and reprocess the mailpieces further. Multi-pass machines usually have smaller footprints because they have far fewer receiving bins then their single-pass counterparts. This also contributes to their lower cost.

The trade-off for the smaller and less-costly multi-pass machines is that they are considerably slower and more costly to operate because of the labor and time required for processing the mailpieces more than once. Mailpieces in multi-pass machines experience more wear and tear then in a single-pass machine.

It is, therefore, desirable to provide a mail sorting method and system having the ability to sort incoming mailpieces using a single pass process with fewer receiving bins than the number of mailstops being sorted.

SUMMARY OF THE INVENTION

A method and system for sorting incoming mail is provided. An embodiment of the system includes a fewer number of receiving bins than the required number of sort destinations or mailstops and can handle the mailpieces using a single-pass sort process. An embodiment of the method includes using sorting algorithms and the automatic discharging of receiving bins to provide single-pass sorting of mailpieces with a fewer number of receiving bins than required sort destinations.

An embodiment of the system includes a mail singulation apparatus to receive the mailpieces to be sorted and to present them to a mail scanning apparatus one at a time. The mail scanning apparatus scans the mailstop address affixed on the mailpieces to identify the mailstop of each mailpiece. On the first mailpiece received, the mailstop is identified and assigned to one of a number of receiving bins by a control system operatively connected to the singulation apparatus and the scanning apparatus. A conveyor apparatus then carries the mailpiece along the conveyor until it reaches to the receiving bin assigned with its mailstop. The conveyor apparatus then deposits the mailpiece into the receiving bin. This process is repeated with each successive mailpiece until all of the receiving bins have been assigned with a mailstop. A control system including a general purpose computer controls the operation of the apparatuses of the system.

If and when a new mailpiece is received and scanned with a new mailstop that is different from the mailstops already assigned to each of the receiving bins, the control system then makes a determination as to which of the receiving bins is to be emptied of its existing contents of mailpieces and be reassigned with the new mailstop. The control system uses an algorithm to make this determination. The algorithm can be influenced by any number of parameters that includes but are not limited to the impending mailpieces to be sorted, historical information related to the sorting operation and operator preferences configured on the control computer to name but a few.

When the control system has determined which receiving bin is to be emptied and reassigned, the control system issues a command to the receiving bin to empty its contents. In some embodiments, the control system can alert an operator that the receiving bin has been emptied. The control system will also inform the operator of the mailstop associated with the contents emptied from the receiving bin. This can be done in a number of ways. One is to print a piece of paper or tag with the mailstop of the contents and deposit the tag with the emptied contents. Another is to dispense a reusable token printed with the mailstop of the contents with the emptied contents. Yet another is to visually display the mailstop on a video display located at the receiving bin that has been emptied. Still another is to audibly broadcast a message containing the mailstop from an audio playback system. Upon identifying the mailstop of the emptied contents, the control system then assigns the new mailstop to the emptied receiving bin and conveys the new mailpiece into that receiving bin.

According to one aspect of the invention, mailpieces are sorted in a single pass by receiving a mailpiece with a mail singulation apparatus, with the mailpiece having a mailstop affixed thereon; identifying the mailstop associated with the mailpiece; assigning the mailstop to one of a plurality of receiving bins if the mailstop has not already been assigned to a receiving bin, each of the receiving bins being capable of emptying its contents upon receiving a command to empty its contents; and conveying the mailpiece to the receiving bin assigned with the mailstop associated with the mailpiece and depositing the mailpiece into the receiving bin.

According to another aspect of the invention, a system for sorting mailpieces in a single pass includes: a mail singulation apparatus adapted for receiving a mailpiece having a mailstop affixed thereon; a mailpiece scanning apparatus for scanning and identifying the mailstop of the mailpiece, with the scanning apparatus operatively coupled to the singulation apparatus; a plurality of receiving bins, each bin capable of emptying its contents upon receiving a command to empty its contents; a conveyor apparatus operatively coupling the singulation apparatus to the plurality of receiving bins, the conveyor apparatus being adapted to carry a mailpiece from the singulation apparatus to any one of the plurality of receiving bins; and a control system operatively coupled to the singulation apparatus, to the scanning apparatus, to each of the plurality of receiving bins and to the conveyor apparatus, wherein the control system is adapted to assign the mailstop to any one of the plurality of receiving bins, the control system further adapted to cause the conveyor apparatus to carry the mailpiece to the receiving bin assigned with the mailstop, the control system further adapted to cause the conveyor apparatus to carry the mailpiece to the receiving bin assigned with the mailstop and deposit the mailpiece into the receiving bin.

According to yet another aspect of the invention, a system for sorting mail comprises: first means for receiving a plurality of mailpieces having mailstops affixed thereon and for presenting the mailpieces one at a time; second means for identifying the mailstop of each mailpiece present by the first means, the second means operatively connected to the first means; third means for assigning a mailstop identified by the second means to one of a plurality of receiving bins if the mailstop has not already been assigned to a receiving bin, the third means operatively connected to the first and second means; fourth means for conveying a mailpiece whose mailstop has been identified by the second means and assigned to a receiving bin by the third means to the assigned receiving bin and depositing the mailpiece therein, the fourth means operatively connected to the first, second and third means; and a plurality of receiving bins, each receiving bin adapted to receive mailpieces from the fourth means.

DETAILED DESCRIPTION OF EMBODIMENTS

The following is a detailed description of the embodiments of a method and system for sorting mailpieces as shown in the attached figures. For the purposes of this specification, the term "mailpieces" shall refer to all forms of mail including but not limited to envelopes and parcels. Wherever possible, the same reference numbers shall be used throughout to refer to the same or similar elements.

Figure 1:
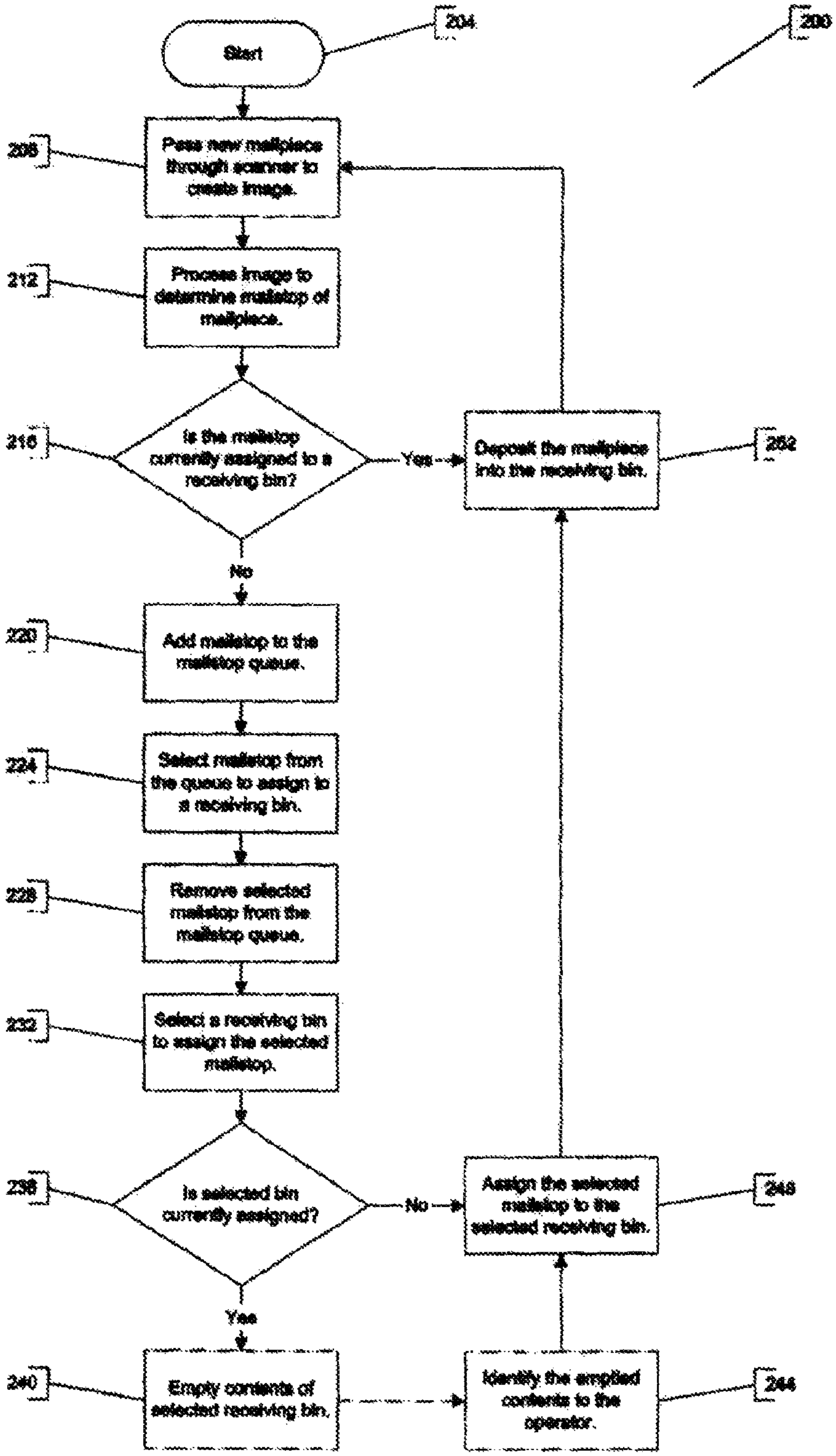
FIG. 1 is a flowchart depicting an embodiment of a method for sorting mailpieces.
Figure 7:
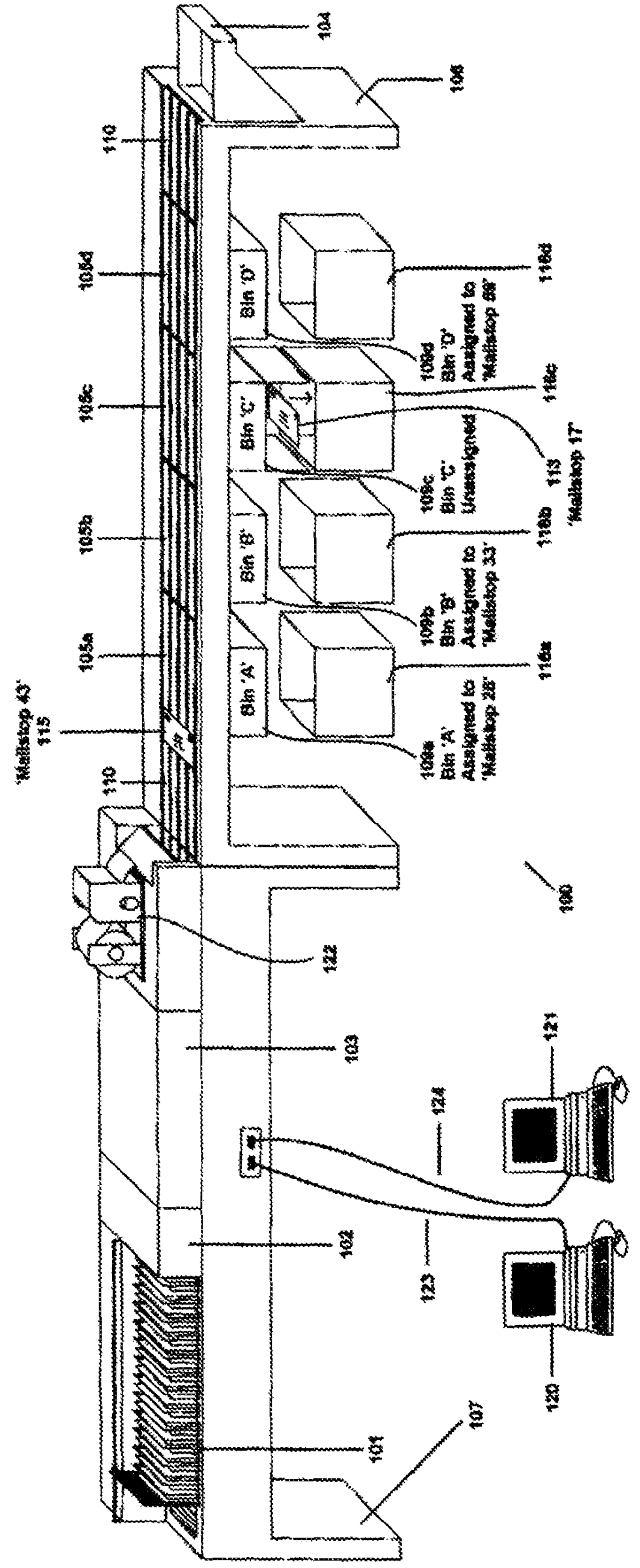
FIG. 7 is a perspective view depicting the system of FIG. 2 emptying the contents of the third receiving bin.
Figure 8:
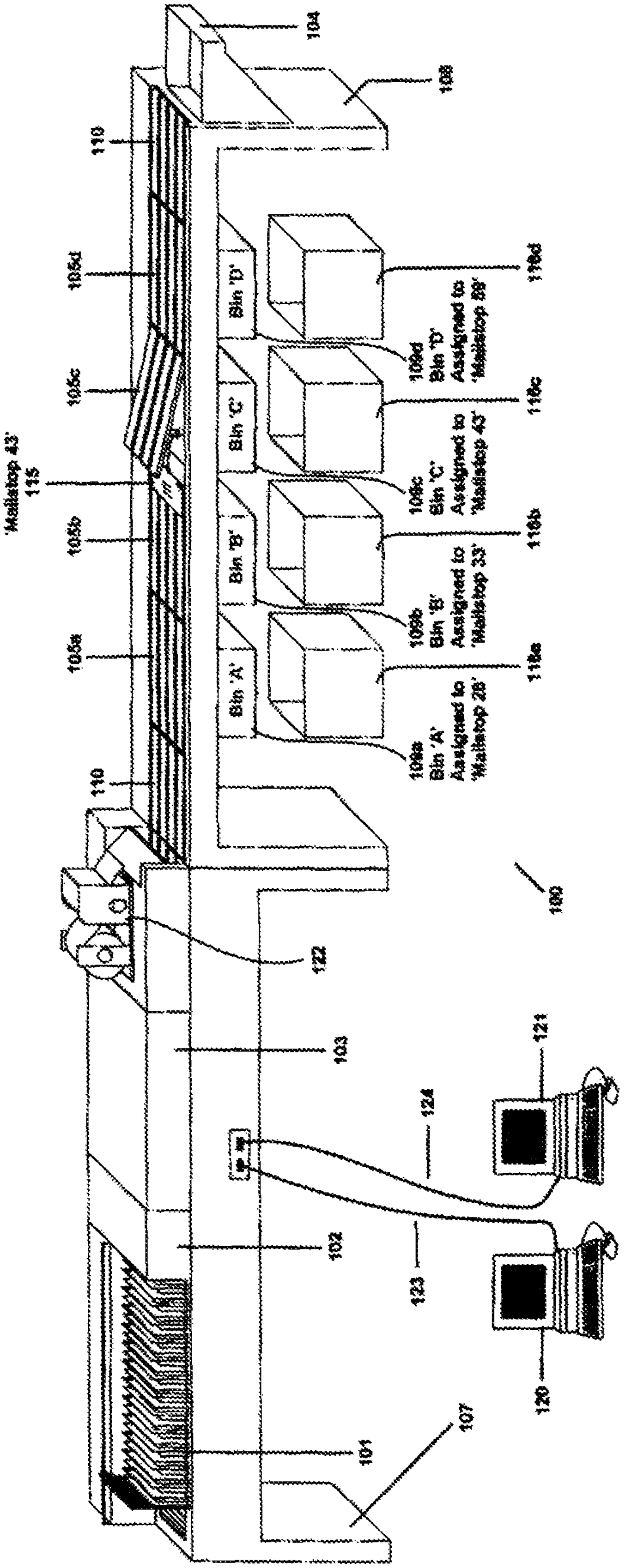
FIG. 8 is a perspective view depicting the system of FIG. 2 depositing a new mailpiece into the third receiving bin that has been reassigned with the mailstop of the new mailpiece.

Briefly, FIG. 1 is a flow chart depicting an embodiment of a method for sorting mailpieces. FIGS. 2 through 8 are sequential drawings that depict an example of a typical mail sorting process in accordance with an embodiment of a system for sorting mailpieces. FIGS. 3 through 6 illustrate the process of assigning receiving bins to receive mailpieces belonging to specific mailstops. FIG. 7 illustrates the introduction of a unique mailstop after all receiving bins have been assigned with a mailstop whereupon one receiving bin is being emptied so as to be assigned with the new mailstop. FIG. 8 illustrates a new mailpiece being deposited into a receiving bin that has been reassigned with a mailstop of the new mailpiece.

FIG. 1 illustrates a flow chart setting out process 200 that describes an embodiment of a method for sorting mailpieces. Process 200 starts at step 204 and is followed by step 208 where a mailpiece is passed by a mail scanner to create an image of the mailpiece. At step 212, the image is processed to determine the mailstop address affixed on the mailpiece. The mailstop address may be printed on the mailpiece itself or printed on a label attached to the mailpiece. At step 216, a determination is made if the mailstop has been assigned to a receiving bin. If "yes", then process 200 proceeds to step 252 where the mailpiece is conveyed to its receiving bin and deposited therein, following which process 200 returns to step 208 where another mailpiece is passed through the scanner.

If the answer at step 216 is "no", the mailstop is added to the mailstop queue at step 220. A mailstop is selected from the queue at step 224 for assignment to a receiving bin. The determination of which mailstop is selected can be made in accordance with any number of predetermined criteria. For example, the determination can be made according to an operator's preferences in configuring the control system. The determination can also be made by the control system basing its decision on the outcome of running an algorithm to select the mailstop.

The algorithm can be based on monitoring at least one piece of information associated with the incoming mailpieces, such as their mailstop address. Alternatively, the algorithm can be based on monitoring at least one piece of information associated with the receiving bins such as the volume of mailpieces being deposited into them. Another criteria can be historical information relating to the past mailpieces received and sorted. Yet another criteria can be based on the position of each mailpiece within the sorting system itself. The algorithm can easily be derived by a person skilled in the art once the criteria has been chosen for selecting mailstops.

Upon the control system selecting a mailstop, the mailstop is removed from the queue at step 228. At step 232, the control system selects a receiving bin to be assigned with the mailstop. As in selecting the mailstop from the mailstop queue, the control system makes a selection upon operator preferences or upon the outcome of processing an algorithm using any number of external criteria or parameters in making a determination as to which receiving bin to select. It should also be obvious to a person skilled in the art that the control system can embody a neural network approach to learn and to adapt as process 200 operates over time in selecting both mailstops and receiving bins.

At step 236, the control system will check if the selected receiving bin has already been assigned with a mailstop. If "yes", the control system issues a command to the receiving bin at step 240 to empty its contents. At step 244, the control system identifies the emptied contents to the operator whereupon the operator can retrieve the contents and forward the contents to its mailstop destination. Process 200 then proceeds to step 248 whereupon the receiving bin is assigned with the new mailstop. If the answer at step 236 is "no", the process 200 proceeds from step 236 to step 248. After step 248, process 200 proceeds to step 252 whereupon the mailpieces deposited into the receiving bin. Process 200 then returns to step 208 to process another mailpiece.

Figure 2:
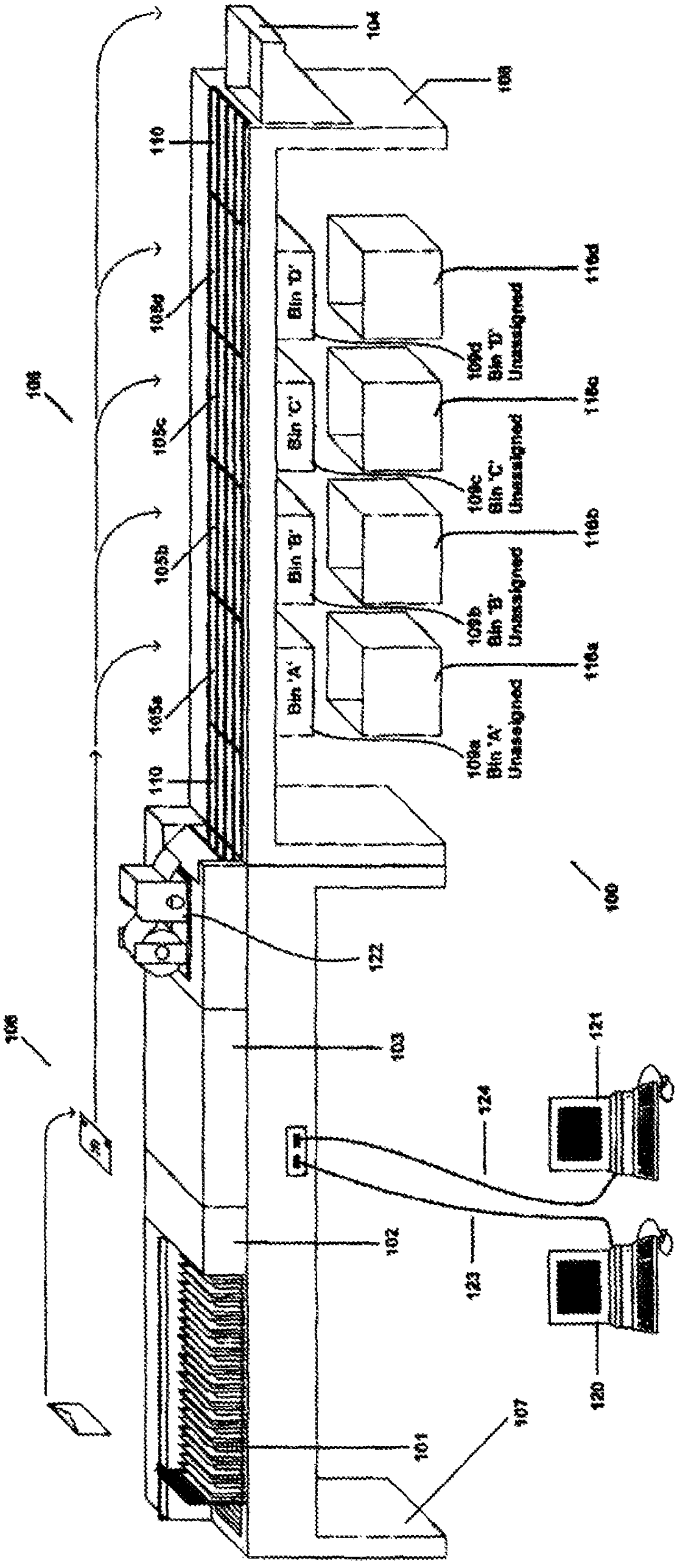
FIG. 2 is a perspective view depicting an embodiment of a system for sorting mailpieces.

Referring to FIG. 2, sorting system 100 is shown. In this figure, system 100 is configured as a simple linear mail sorting machine with only four receiving bins 109*a* to 109*d* and a reject bin 104 located at the end of a conveyor path 106 consisting of static conveyor sections 110 and gated conveyor sections 115*a* to 115*d*. This embodiment is shown only as an illustration of the system and not as a limitation of the system. It should be obvious to a person skilled in the art that the concepts described herein can be applied to mail sorting devices or machines of all types and configurations, not just the simple linear embodiment shown in the attached figures including mail sorting machines where mailpieces can be conveyed or "looped" past the receiving bins repeatedly.

System 100 comprises feeding unit 107 that feeds mailpieces 101 into singulation unit 102 where the mailpieces are placed on a conveyor one at a time and with the address label facing upwards so it can be scanned. Mailpieces 101 are then fed into scanning unit 103 so that an image can be taken of each mailpiece. An image processing computer 120 is operatively attached to scanning unit 103 with link 123 to control the operation of scanning unit 103 and to process the images taken of mailpieces 101 to determine their mailstop addresses. Image processing computer 120 is a general purpose computer running optical recognition software that works with scanning unit 103 to process the images of scanned mailpieces to determine their mailstop. Such systems and software are well known to those skilled in the art.

System 100 further comprises distribution unit 108 which consists of conveyor sections 105*a* to 105*d* and 110, receiving bins 109*a* to 109*d* and receptacles 116*a* to 116*d*. Static conveyor sections 110 remain fixed in orientation and transport the mail laterally along its belts. Gated conveyor sections 105*a* to 105*d* are hinged on one end so that the other end can lift up to expose a receiving bin underneath, and allow a mailpiece to drop therein. A gated conveyor section is positioned above each receiving bin. Receptacles 116*a* to 116*d* are positioned beneath receiving bins 109*a* to 109*d*, respectively.

A printer 122 is operatively attached to system 100 for printing tags, the purpose of which shall be discussed in further detail below. A system control computer 121 is operatively attached to system 100 by a link 124 to control the operations of the sub components of system 100. System control computer 121 is a general purpose computer having a computer memory with a program code segment stored thereon. The program code segment is adapted to control the operation of system control computer 121 and the operations of system 100 in accordance with process 200 as shown in FIG. 1.

The program code segment is further adapted to receive the mailstops of mailpieces identified by scanning unit 103 and assigning these mailstops to receiving bins 109*a* to 109*d*. Upon assigning a mailstop to a receiving bin, the program code segment causes system control computer 121 to operate distribution unit 108 to convey the mailpieces to a receiving bin according to their mailstop. When system 100 first starts a sorting process, no receiving bin will be assigned a mailstop until a first mailpiece is processed by scanning unit 103 and image processing computer 120 to determine its mailstop.

Figure 3:
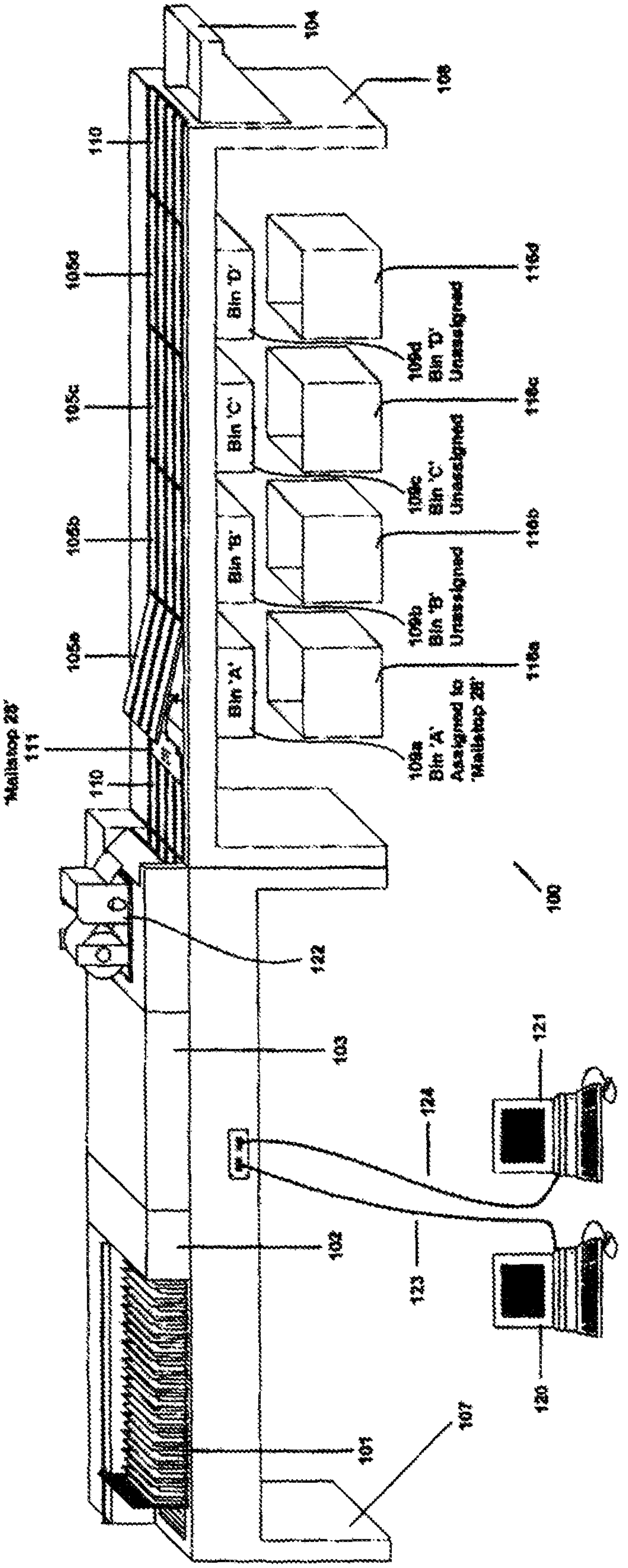
FIG. 3 is a perspective view depicting the system of FIG. 2 depositing a mailpiece into the first receiving bin.

Referring to FIG. 3, mailpiece 111 is shown having already passed through feeding unit 107 and scanning unit 103. In this example, mailpiece 111 has been determined to belong to mailstop "28". System control computer 121 has assigned this mailstop to receiving bin 109*a* to hold mailpieces belonging to mailstop "28". As mailpiece 111 travels along conveyor path 106, gated conveyor section 105*a* opens to receive mailpiece 111. System 100 will continue to deposit all mailpieces destined to mailstop "28" in receiving bin 109*a* until such time receiving bin 109*a* is no longer assigned to mailstop "28".

Figure 4:
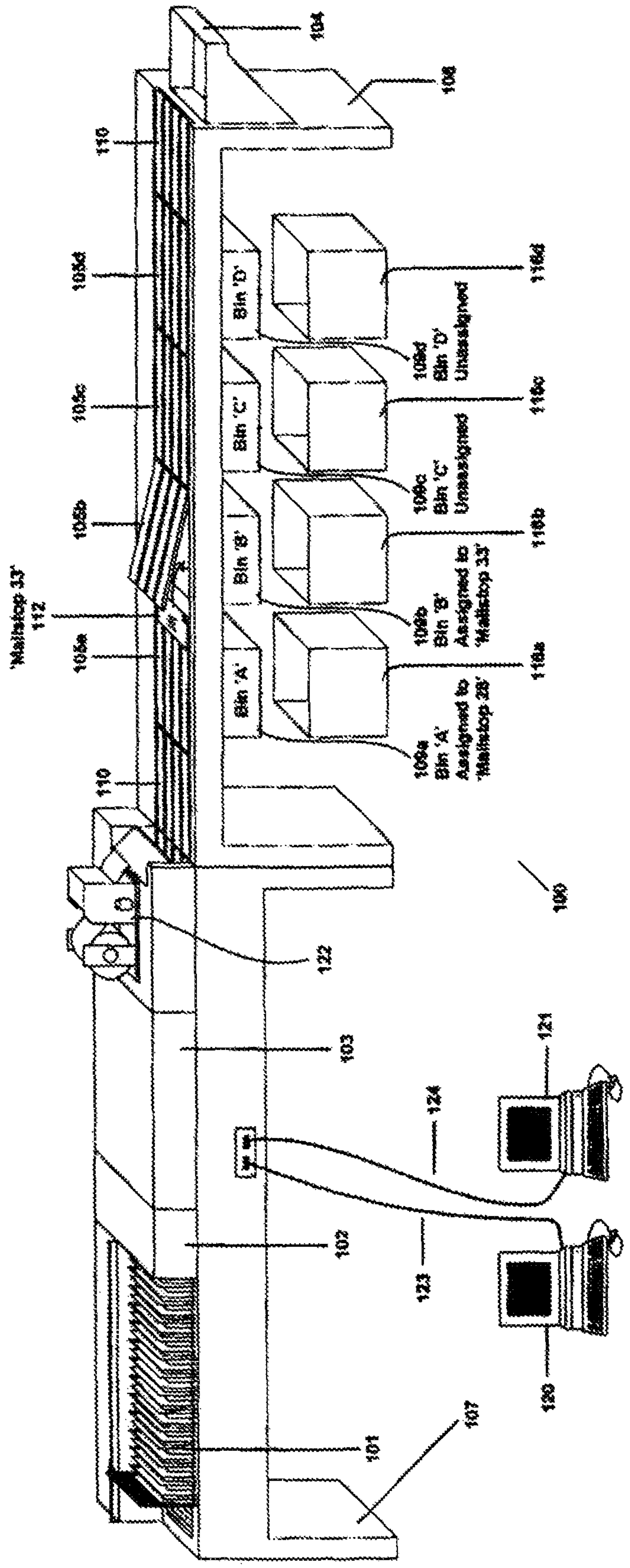
FIG. 4 is a perspective view depicting the system of FIG. 2 depositing a mailpiece into the second receiving bin.

When a mailpiece enters singulation unit 102 having a mailstop that is different than the mailstop assigned to receiving bin 109*a*, system 100 will then assign the mailstop to an available receiving bin. Referring to FIG. 4, mailpiece 112 has been determined by scanning unit 103 and image processing computer 120 to belong to mailstop "33". As mailpiece 112 moves along conveyor path 106, gated conveyor section 105*b* opens and will allow mailpiece 112 to drop into receiving bin 109*b*. System 100 will continue to deposit all mailpieces destined to mailstop "33" in receiving bin 109*b* until such time receiving bin 109*b* is no longer assigned to mailstop "33".

Figure 5:
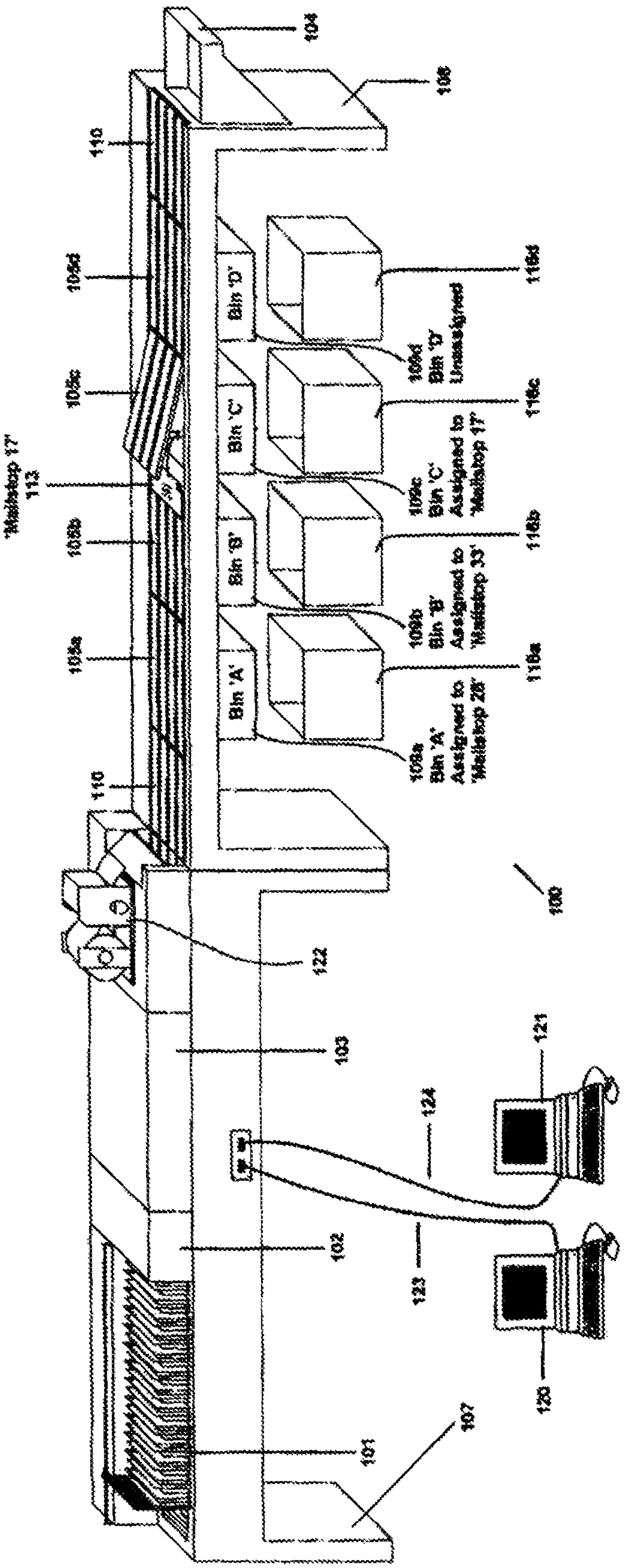
FIG. 5 is a perspective view depicting the system of FIG. 2 depositing a mailpiece into the third receiving bin.

Referring to FIG. 5, mailpiece 113 has been determined to belong to mailstop "17". In this instance, system control computer 121 has assigned mailstop "17" to receiving bin 109*c*. As mailpiece 113 move along conveyor path 106, gated conveyor section 105*c* opens and will allow mailpiece 113 to drop into receiving bin 109*c*. System 100 will continue to deposit all mailpieces destined for mailstop "17" into receiving bin 109*c* until such time receiving bin 109*c* is no longer assigned to mailstop "17".

Figure 6:
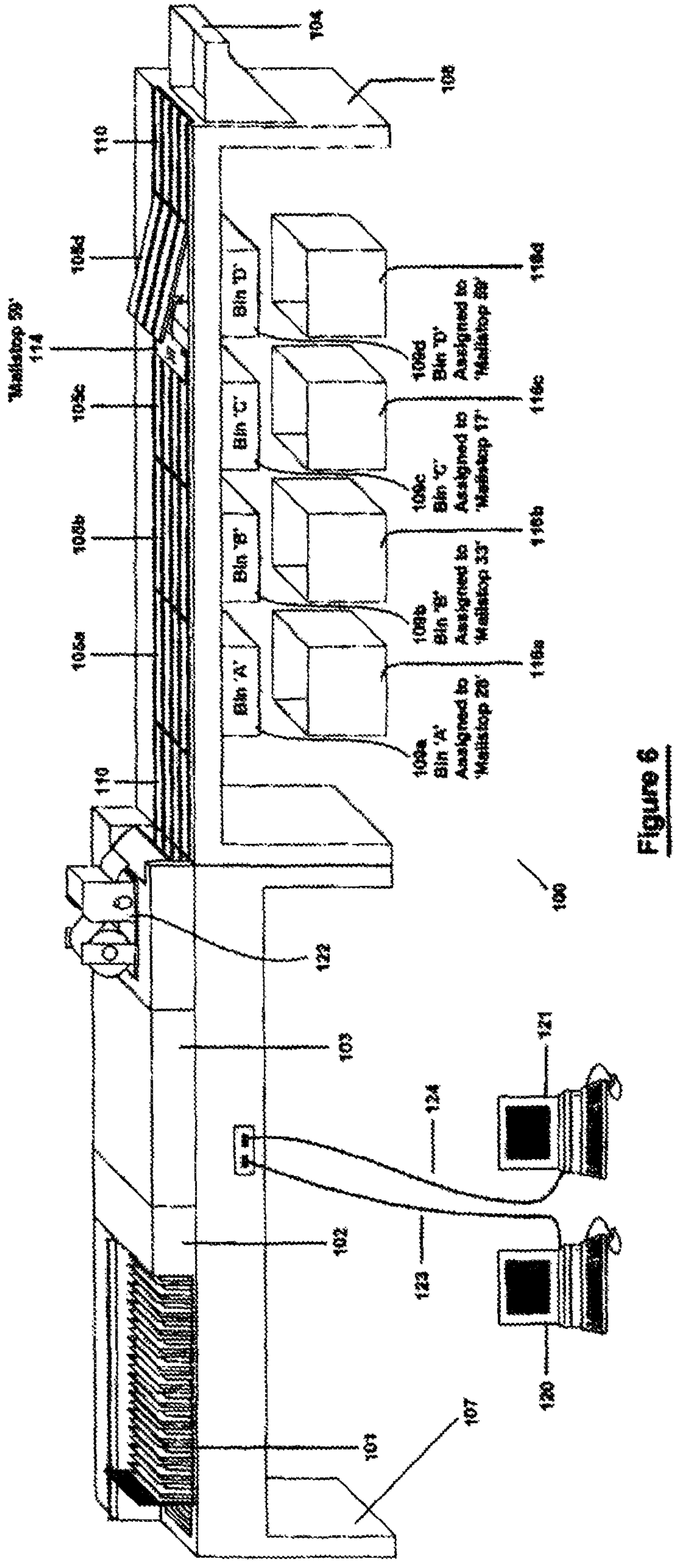
FIG. 6 is a perspective view depicting the system of FIG. 2 depositing a mailpiece into the fourth receiving bin.

Referring to FIG. 6, mailpiece 114 has been determined to belong to mailstop "59". In this instance, system control computer 121 has assigned mailstop "59" to receiving bin 109*d*. As mailpiece 114 moves along conveyor path 106, gated conveyor section 105*d* opens and will allow mailpiece 114 to drop into receiving bin 109*d*. System 100 will continue to deposit all mailpieces destined to mailstop "59" until such time receiving bin 109*d* is no longer assigned to mailstop "59".

When a mailpiece with a fifth unique mailstop is presented to system 100, as shown in the figures herein, system control computer 121 will assign the new mailstop to a receiving bin. To do so will require that a receiving bin already assigned with a mailstop empty its contents so that it can be reassigned with the new mailstop and receive mailpieces destined for the new mailstop. This is shown in FIGS. 7 and 8.

Referring to FIG. 7, mailpiece 115 is passed through scanning unit 103 and has been determined to belong to mailstop "43" by system control computer 121. As all of receiving bins 109*a* to 109*d* have been assigned, system control computer 121 makes the determination as to which receiving bin it will reassign to receive mailpiece 115. In this instance, system control computer 121 has selected receiving bin 109*c* to be reassigned as mailstop "43". In doing so, the program code segment stored on system control computer 121 causes it to issue a command to receiving bin 109*c* to empty its contents into receptacle 116*c*.

In one embodiment, system control computer 121 issues a tag indicating the mailstop of the contents in receptacle 116*c*. This is accomplished by system control computer 121 causing printer 122 to print a piece of paper or tag with the mailstop assigned to receiving bin 109*c*, mailstop "17", and deposit the tag onto conveyor section 110. The tag is then conveyed along path 106 and deposited into receiving bin 109*c* which, in turn, is emptied into receptacle 116*c*. In this manner, the operator retrieving the contents from receptacle 116*c* will see the tag and direct the contents to the mailstop printed on the tag. Printer 122 can be a thermo printer although it should be obvious to a person skilled in the art that any comparable printing device will work. In another embodiment, system control computer 121 can additional alert an operator that receiving bin 109*c* has emptied its contents although this is not essential nor is it necessary.

In addition to the mailstop information, the tag can contain other information such as the number of pieces contained and the route identification number for delivery of the mailpieces. The information printed on the tag can be controlled by predefined settings entered into system control computer 121 by an operator. In other embodiments, printer 122 can be replaced with a token dispenser (not shown) where reusable tokens (not shown) preprinted with mailstop numbers are dispensed onto path 106 to be deposited into the receiving bin with the sorted mailpieces to indicate the mailstop destination to an operator. In other embodiments, visual displays (not shown) or audible play back systems (not shown) can be used in place of printer 122 or token dispensers.

The visual display provides visual information as to the mailstop destination for mailpieces emptied into a receptacle. Alternatively, an audible playback system can audibly inform an operator, using a voice synthesizer, of the mailstop destination and other relevant information. Once receiving bin 109*c* has been emptied, receiving bin 109*c* is then available to be reassigned with a new mailstop. In alternate embodiments, the operator is alerted to the fact that receiving bin 109*c* has been emptied.

In another embodiment, system control computer 121 alerts the operator to manually empty receiving bin 109*c*. In yet another embodiment, the operator can manually empty receiving bin 109*c* on his own accord upon which system control computer 121 is informed of which receiving bin has been emptied, either by sensors (not shown) located on distribution unit 108 detecting that a bin is empty or by the operator manually inputting which bin was emptied by pressing a button (not shown) or using a keyboard attached to system control computer 121.

In another embodiment, receiving bin 109*c* is removed from distribution unit 108 and replaced with a new empty bin instead of being emptied. In yet another embodiment, a replacement bin associated with the new mailstop being assigned by system control computer 121 (not shown) is provided to replace receiving bin 109*c*. The replacement bin may be empty or may contain mailpieces addressed to the new mailstop being assigned to the bin location where receiving bin 109*c* was located. This bin replacement process can be performed manually by the operator or it can be automated through additional hardware (not shown) attached to distribution unit 108 that is controllable by system control computer 121.

Referring to FIG. 8, system control computer 121 has reassigned receiving bin 109*c* as mailstop "43". In this instance, mailpiece 115 is conveyed along path 106 as gate conveyor section 105*c* is opened. Mailpiece 115 is then deposited into receiving bin 109*c*.

The method and system described herein is shown with only four receiving bins although it will be obvious to a person skilled in the art that any number of receiving bins can be used. The number of receiving bins does not have to be equal to or greater than the number of mailstops contained within a group of mailpieces being sorted, rather, the number of receiving bins can be less than the number of mailstops given the ability of the system to dynamically assign and reassign "m" number of mailstops to "n" number of receiving bins where "m" is greater than "n".

It is also noted that relationships exist between: a) the number of receiving bins; b) the number of required mailstops contained within the group of mailpieces being sorted; and c) the average number of mailpieces emptied from a receiving bin when it is being reassigned with a new mailstop.

The quotient consisting of a number of required mailstops divided by the number of receiving bins is inversely proportional to the average number of mailpieces emptied from a receiving bin when being reassigned. Furthermore, the average number of mailpieces emptied from a receiving bin is inversely proportional to the frequency of emptying cycles of the receiving bins, at a given input rate of mailpieces. These relationships indicate that the mail sorting system must have at least one receiving bin and that the number of receiving bins does not affect the ability of the system to sort mailpieces. However, the number of receiving bins required by the system is a function of an operator's requirements regarding the average number of mailpieces to be emptied from a receiving bin and on how frequent the receiving bins are to be emptied.

Although a few preferred embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

I claim:

1. A method for sorting mailpieces in a single pass, the method comprising the steps of:

a) receiving a mailpiece with a mail singulation apparatus, the mailpiece having a mailstop affixed thereon;

b) identifying the mailstop associated with the mailpiece;

c) assigning the mailstop to one of a plurality of receiving bins if the mailstop has not already been assigned to a receiving bin, each of the receiving bins capable of emptying its contents upon receiving a command to empty its contents, d) conveying the mailpiece to the receiving bin assigned with the mailstop associated with the mailpiece and depositing the mailpiece into the receiving bin; and e) wherein if and when all of the plurality of receiving bins have been assigned with a mailstop and a new received mailpiece is identified with a new mailstop that has not been assigned to a receiving bin, the method further comprising the steps of:

i) issuing a command to a first receiving bin to empty its contents whereupon the first receiving bin empties its contents into a receptacle, ii) reassigning the first receiving bin with the new mailstop of the new received mailpiece, and iii) conveying the new received mailpiece into the first receiving bin.

2. The method as set forth in claim 1 further comprising the step of identifying the mailstop of the contents emptied from the first receiving bin to an operator.

3. The method as set forth in claim 1 further comprising the steps of alerting an operator that the first receiving bin has emptied its contents and then identifying the mailstop of the contents emptied from the first receiving bin to the operator.

4. The method as set forth in claim 1 wherein the step of assigning the mailstop to one of the plurality of receiving bins is made in accordance with at least one operator setting entered into a control system adapted to carry out the method.

5. The method as set forth in claim 1 wherein the step of identifying the mailstop comprises printing the mailstop onto a piece of paper.

6. The method as set forth in claim 5 further comprising the step of depositing the printed paper with the contents emptied from the first receiving bin.

7. The method as set forth in claim 1 further comprising the step of binding the contents emptied from the first receiving bin.

8. The method as set forth in claim 6 further comprising the step of binding the printed paper with the contents emptied from the first receiving bin.

9. The method as set forth in any one of claims 1 to 8 wherein the mailpieces are incoming mailpieces.

10. A system for sorting mailpieces in a single pass, comprising:

a) a mail singulation apparatus adapted for receiving a mailpiece having a mailstop affixed thereon and for presenting the mailpiece to a mailpiece scanning apparatus;

b) a mailpiece scanning apparatus for scanning and identifying the mailstop of the mailpiece, the scanning apparatus operatively coupled to the singulation apparatus;

c) a plurality of receiving bins, each bin capable of emptying its contents upon receiving a command to empty its contents;

d) a conveyor apparatus operatively coupling the singulation apparatus to the plurality of receiving bins, the conveyor apparatus adapted to carry a mailpiece from the singulation apparatus to any one of the plurality of receiving bins; and e) a control system operatively coupled to the singulation apparatus, to the scanning apparatus, to each of the plurality of receiving bins and to the conveyor apparatus, wherein the control system is adapted to assign the mailstop to any one of the plurality of receiving bins, the control system further adapted to cause the conveyor apparatus to carry the mailpiece to the receiving bin assigned with the mailstop, the control system further adapted to cause the conveyor apparatus to carry the mailpiece to the receiving bin assigned with the mailstop and deposit the mailpiece into the receiving bin, wherein the control system is further adapted to transmit a command to a first receiving bin to empty its contents if and when the scanning apparatus identifies a new mailpiece having a new mailstop after all of the receiving bins have been assigned a mailstop different from the new mailstop, the control system further adapted to reassign the first receiving bin with the new mailstop and to cause the conveyor apparatus to carry the new mailpiece to the first receiving bin and deposit the new mailpiece into the first receiving bin.

11. The system as set forth in claim 10 wherein the conveyor apparatus is adapted to circulate the received mailpieces through the system more than once.

12. The system as set forth in claim 10 wherein the conveyor apparatus is adapted to carry the received mailpieces past each receiving bin more than once.

13. The system as set forth in claim 10 wherein the control system is adapted to alert an operator that the first receiving bin has emptied its contents.

14. The system as set forth in claim 13 further comprising means for identifying the mailstop of the contents emptied from the first receiving bin to the operator.

15. The system as set forth in claim 14 wherein the identifying means comprises a printer for printing a piece of paper with the mailstop of the contents emptied from the first receiving bin.

16. The system as set forth in claim 15 wherein the system is further adapted to deposit the printed paper with the contents emptied from the first receiving bin.

17. The system as set forth in claim 10 further comprising a bundling device for bundling the contents emptied from the first receiving bin.

18. The system as set forth in claim 16 further comprising a bundling device for bundling the contents emptied from the first receiving bin.

19. The system as set forth in any one of claims 10 to 18 wherein the mailpieces are incoming mailpieces.

20. A system for sorting mailpieces, comprising:

a) first means for receiving a plurality of mailpieces having mailstops affixed thereon and for presenting the mailpieces one at a time;

b) second means for identifying the mailstop of each mailpiece present by the first means, the second means operatively connected to the first means;

c) third means for assigning a mailstop identified by the second means to one of a plurality of receiving bins if the mailstop has not already been assigned to a receiving bin, the third means operatively connected to the first and second means, the third means comprising a general purpose computer configured to assign a mailstop identified by the second means to a receiving bin;

d) fourth means for conveying a mailpiece whose mailstop has been identified by the second means and assigned to a receiving bin by the third means to the assigned receiving bin and depositing the mailpiece therein, the fourth means operatively connected to the first, second and third means; and e) a plurality of receiving bins, each receiving bin adapted to receive mailpieces from the fourth means where in the event that all of the receiving bins have been assigned a mailstop and the mail scanning apparatus identifies a mailpiece having a new mailstop that is not assigned to a receiving bin, the computer is further adapted to select a receiving bin and to generate and transmit a command to the selected receiving bin to empty its contents and to assign the new mailstop to the selected receiving bin after it has emptied its contents.

21. The system as set forth in claim 20 wherein each of the plurality of receiving bins is adapted to empty its contents upon receiving a command to empty its contents.

22. The system as set forth in claim 20 wherein the first means comprises a mail singulation apparatus adapted to present the plurality of mailpieces to a mail scanning apparatus.

23. The system as set forth in claim 20 wherein the second means comprises a mailpiece scanning apparatus adapted to optically scan and identify the mailstop of each mailpiece that passes therethrough.

24. The system as set forth in claim 20 wherein the fourth means comprises a conveyor adapted to move mailpieces from the mail scanning apparatus past each of a plurality of receiving bins.

25. The system as set forth in claim 20 wherein the computer uses information associated with the mailpieces to select the selected receiving bin.

* * * * *